United States Patent
Katikaneni et al.

(10) Patent No.: US 11,277,004 B1
(45) Date of Patent: Mar. 15, 2022

(54) SUPPLYING OFF-GRID POWER TO A REMOTE FACILITY

(71) Applicant: Saudi Arabian Oil Company, Dhahran (SA)

(72) Inventors: Sai P. Katikaneni, Dhahran (SA); Kunho Lee, Dhahran (SA); Tolga Tural, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/140,266

(22) Filed: Jan. 4, 2021

(51) Int. Cl.
*H02J 1/12* (2006.01)
*H02J 3/38* (2006.01)
*H02S 40/38* (2014.01)
*H02S 40/36* (2014.01)
*H01M 8/0221* (2016.01)

(52) U.S. Cl.
CPC ............ *H02J 1/12* (2013.01); *H01M 8/0221* (2013.01); *H02J 3/381* (2013.01); *H02S 40/36* (2014.12); *H02S 40/38* (2014.12)

(58) Field of Classification Search
CPC ..... H02J 1/12; H02J 3/381; H02J 3/38; H02S 40/36; H02S 40/38; H01M 8/0221
See application file for complete search history.

(56) References Cited

U.S. PATENT DOCUMENTS

| | | |
|---|---|---|
| 9,249,064 B2 | 2/2016 | Kumar et al. |
| 2007/0277870 A1 | 12/2007 | Wechsler |
| 2012/0267952 A1 * | 10/2012 | Ballatine ................ H02J 3/387 307/26 |

FOREIGN PATENT DOCUMENTS

| | | |
|---|---|---|
| CN | 203415657 | 1/2014 |
| GB | 2461032 | 12/2009 |
| WO | 2010107942 | 9/2010 |
| WO | 2014170184 | 10/2014 |

OTHER PUBLICATIONS

Cimino et al., Deploying a solar hybrid technology in a remote oil and gas production site. Journal of the Japan Institute of Energy 94, 2015, 1163-1168, 6 pages.
Desouza et al., "Portable Emission Measurement System (PEMS) Testing of a 100KVA Generator using Red Diesel and ISO Grade Diesel" Environmental Research Group, King's College London, 12 pages.

(Continued)

*Primary Examiner* — Robert L Deberadinis
(74) *Attorney, Agent, or Firm* — Fish & Richardson P.C.

(57) ABSTRACT

An off-grid power system includes a first renewable electrical power assembly configured to produce direct current (DC) electrical power from a first renewable source; a second renewable electrical power assembly configured to produce DC electrical power from a second renewable source; an electrical power circuit that electrically couples the first and second renewable electrical power assemblies together and changes the DC electrical power to at least one of a DC power supply or an alternating current (AC) power supply; and an off-grid hydrocarbon production or processing facility electrically coupled to the electrical power circuit to receive the at least one of the DC power supply or the AC power supply from the electrical power circuit.

35 Claims, 5 Drawing Sheets

(56) References Cited

OTHER PUBLICATIONS

Homerenergy.com[online], "Homer Pro 3.14" Jun. 19, 2020, [retrieved on Dec. 28, 2020], retrieved from: URL <https://www.homerenergy.com/products/pro/docs/latest/how_homer_creates_the_generator_efficiency_curve.html>, 1 page.

Shojaeddini et al., "Oil and gas company strategies regarding the energy transition" Progress in Energy, 2019, 20 pages.

* cited by examiner

|  | Efficiency | $CO_2$ Emission into Air | $NO_x$ Emission into Air | Particulate Matter (PM) |
|---|---|---|---|---|
| Diesel Generator | ~31% (1) | 620g/kWh (4) | 4.07g/kWh (4) | 0.02g/kWh (4) |
| PEM Fuel Cell | ~45% (2) | 0 | 0 | 0 |
| Reversible Fuel Cell On-site H2 generation and power with fuel gas and reformer | ~36% (3) | ~100g/kWh (5) | 0 (6) | 0 |

Efficiency and Environmental Impact Comparison Between Options (1) Typical 40 kW Diesel Generator (75% Load Base ) (~34% : Full Load Case) (https://www.homerenergy.com/products/pro/does/latest/how_homer_creates_the_generator_efficiency_curve.html)
(2) Commercialized Typical PEM Fuel Cell System Efficiency
(3) Developed Membrane Reformer Efficiency (~80%) x Fuel Cell Efficiency (~45% in Case PEM fuel cell)
(4) http://www.clec.uk/sites/default/files/Generator%20Fuel%20Analysis%20Final%20Report.pdf
(5) Carbon Capture and Utilization (CCU) (90%rate)Unit Equipped
(6) Due to Operating at Low Temperature (~600C)

SUPPLYING OFF-GRID POWER TO A REMOTE FACILITY

TECHNICAL FIELD

This disclosure relates to systems and methods for supplying off-grid power to a remote facility and, more particularly, systems and methods for supplying off-grid power to a remote hydrocarbon production or processing facility.

BACKGROUND

Electrical power needed to operate remote facilities, such as oil and facilities at remote locations has been typically supplied by a power transmission and distribution grid. However, power transmission and distribution grid lines can be costly, as are centralized power supply solutions to power multiple facilities. Further, any loss of power may result in significant economic losses given the harsh environment or climate in which remote facilities are located.

SUMMARY

This disclosure describes implementations of an off-grid power system that includes two or more off-grid power sources that can, individually or in combination, supply electrical power to a remote facility that is disconnected (all or partially) from a power transmission and distribution grid. In some aspects, at least one of the off-grid power sources is a solar power system that generates electrical power from solar energy. In some aspects, at least another one of the off-grid power sources is a hydrogen-based fuel cell. In some example implementations, hydrogen fuel may be generated for the hydrogen-based fuel cell at the off-grid power system.

In an example implementation, a power system includes a photovoltaic (PV) assembly that includes a plurality of PV cells configured to produce direct current (DC) electrical power from solar energy; a hydrogen-based polymer exchange membrane (PEM) fuel cell assembly configured to produce DC electrical power from a hydrogen fuel source; a power electronics assembly including at least one of: at least one DC/DC converter configured to convert the produced DC electrical power from one or both of the PV assembly or the hydrogen-based PEM fuel assembly to a DC electrical power supply, or at least one DC/AC inverter configured to convert the produced DC electrical power from one or both of the PV assembly or the hydrogen-based PEM fuel assembly to an alternating current (AC) electrical power supply; and an off-grid hydrocarbon production or processing facility electrically coupled to the power electronics assembly to receive at least one of the DC electrical power supply or the AC electrical power supply from one or both of the PV assembly or the hydrogen-based PEM fuel cell assembly.

In an aspect combinable with the example implementation, the power electronics assembly includes both of: the at least one DC/DC converter configured to convert the produced DC electrical power from one or both of the PV assembly or the hydrogen-based PEM fuel assembly to the DC electrical power supply, and the at least one DC/AC inverter configured to convert the produced DC electrical power from one or both of the PV assembly or the hydrogen-based PEM fuel assembly to the AC electrical power supply.

In another aspect combinable with any of the previous aspects, the power electronics assembly further includes a DC power bus electrically coupled to the PV assembly and the hydrogen-based PEM fuel assembly on a first side through the at least one DC/DC converter; and an AC power bus electrically coupled to a second side of the DC power bus opposite the first side through the at least one DC/AC inverter.

In another aspect combinable with any of the previous aspects, the power electronics further includes at least another DC/DC converter electrically coupled to the second side of the DC power bus.

Another aspect combinable with any of the previous aspects further includes an energy storage assembly electrically coupled to the PV assembly and the hydrogen-based PEM fuel cell assembly through the first side of the DC power bus.

In another aspect combinable with any of the previous aspects, the energy storage assembly is electrically coupled to the off-grid hydrocarbon production or processing facility through the power electronics assembly.

In another aspect combinable with any of the previous aspects, the power electronics further includes at least one transformer electrically coupled between the AC power bus and the off-grid hydrocarbon production or processing facility.

In another aspect combinable with any of the previous aspects, the hydrogen fuel source includes one or more portable hydrogen fuel storage tanks.

In another aspect combinable with any of the previous aspects, the hydrogen fuel source includes at least one multi-fuel reformer assembly configured to receive one or more fuel fluids and a combustion fluid and produce a methane rich gas or a mixture of hydrogen ($H_2$) and carbon dioxide ($CO_2$); and at least one catalytic membrane reformer fluidly coupled to the hydrogen-based PEM fuel cell assembly and the at least one multi-fuel reformer assembly to receive the produced methane rich gas or the mixture of $H_2$ and $CO_2$.

In another aspect combinable with any of the previous aspects, the at least one catalytic membrane reformer is configured to convert the produced methane rich gas or the mixture of $H_2$ and $CO_2$ into hydrogen and $CO_2$ and provide the hydrogen to the hydrogen-based PEM fuel cell assembly.

Another aspect combinable with any of the previous aspects further includes a carbon capture and utilization unit fluidly coupled to the at least one catalytic membrane reformer to receive the $CO_2$ from the at least one catalytic membrane reformer.

In another aspect combinable with any of the previous aspects, the one or more fuel fluids includes at least one of liquefied petroleum gas, ammonia, or methane.

In another aspect combinable with any of the previous aspects, the hydrogen-based PEM fuel cell assembly includes a reversible fuel-cell assembly.

In another aspect combinable with any of the previous aspects, the reversible fuel-cell assembly includes a reversible PEM fuel cell assembly.

In another aspect combinable with any of the previous aspects, the hydrogen fuel source includes at least one multi-fuel ammonia decomposition assembly configured to produce a mixture of hydrogen ($H_2$) and nitrogen ($N_2$); and at least one catalytic membrane ammonia fluidly coupled to the hydrogen-based PEM fuel cell assembly and the at least one multi-fuel reformer assembly to receive the produced methane rich gas or the mixture of $H_2$, and $CO_2$.

In another aspect combinable with any of the previous aspects, the at least one catalytic membrane reformer is configured to convert the produced methane rich gas or the mixture of $H_2$ and $CO_2$ into hydrogen and $CO_2$ and provide the hydrogen to the hydrogen-based PEM fuel cell assembly.

In another example implementation, a method for producing electrical power includes producing direct current (DC) electrical power from solar energy with a plurality of photovoltaic (PV) cells of a PV assembly; producing DC electrical power from a hydrogen fuel source with a hydrogen-based polymer exchange membrane (PEM) fuel cell assembly; operating a power electronics assembly electrically coupled to the PV assembly and the hydrogen-based PEM fuel cell assembly by operating at least one DC/DC converter to convert the produced DC electrical power from one or both of the PV assembly or the hydrogen-based PEM fuel assembly to a DC electrical power supply, or operating at least one DC/AC inverter to convert the produced DC electrical power from one or both of the PV assembly or the hydrogen-based PEM fuel assembly to an alternating current (AC) electrical power supply; and supplying at least one of the DC electrical power supply or the AC electrical power supply from the power electronics assembly to an off-grid hydrocarbon production or processing facility.

An aspect combinable with the example implementation further includes operating the at least one DC/DC converter to convert the produced DC electrical power from one or both of the PV assembly or the hydrogen-based PEM fuel assembly to the DC electrical power supply, and operating the at least one DC/AC inverter to convert the produced DC electrical power from one or both of the PV assembly or the hydrogen-based PEM fuel assembly to the AC electrical power supply.

In another aspect combinable with any of the previous aspects, operating the power electronics assembly further includes providing the produced DC power from at least one of the PV assembly or the hydrogen-based PEM fuel assembly to a first side of a DC power bus through the at least one DC/DC converter; and providing converted DC power from a second side of the DC power bus opposite the first side to an AC power bus through the at least one DC/AC inverter.

Another aspect combinable with any of the previous aspects further includes converting the produced DC power from the at least one of the PV assembly or the hydrogen-based PEM fuel assembly through the DC power bus with at least another DC/DC converter electrically coupled between the second side of the DC power bus and the off-grid hydrocarbon production or processing facility.

Another aspect combinable with any of the previous aspects further includes providing DC electrical power from an energy storage assembly to the first side of the DC power bus.

Another aspect combinable with any of the previous aspects further includes prior to providing DC electrical power from the energy storage assembly to the first side of the DC power bus, comparing an amount of at least one of the DC electrical power supply or the AC electrical power supply to a threshold amount.

Another aspect combinable with any of the previous aspects further includes based on the compared amount being less than the threshold amount, operating the power electronics assembly to at least one of: providing the DC electrical power from the energy storage assembly through the DC power bus to the at least another DC/DC converter; providing the DC electrical power from the energy storage assembly through the DC power bus to the off-grid hydrocarbon production or processing facility; or providing the DC electrical power from the energy storage assembly through the DC power bus to the DC/AC inverter.

In another aspect combinable with any of the previous aspects, operating the power electronics assembly further includes transforming the AC electrical power supply with at least one transformer electrically coupled between the AC power bus and the off-grid hydrocarbon production or processing facility.

In another aspect combinable with any of the previous aspects, the hydrogen fuel source includes one or more portable hydrogen fuel storage tanks, the method further including supplying hydrogen from the one or more portable hydrogen fuel storage tanks to the hydrogen-based PEM fuel cell assembly.

Another aspect combinable with any of the previous aspects further includes producing a methane rich gas or a mixture of hydrogen ($H_2$) and nitrogen ($N_2$) with at least one multi-fuel reformer assembly from one or more fuel fluids and a combustion fluid; supplying the produced methane rich gas with water or ammonia the mixture of $H_2$ and $N_2$ to at least one catalytic membrane reformer fluidly coupled to the hydrogen-based PEM fuel cell assembly; using the produced methane rich gas (LPG or $CH_4$) with water ($H_2O$) to produce hydrogen and carbon dioxide or with only ammonia the mixture of $H_2$ and $N_2$ into hydrogen and nitrogen—with the at least one catalytic membrane reformer; and providing the hydrogen to the hydrogen-based PEM fuel cell assembly.

Another aspect combinable with any of the previous aspects further includes supplying the $CO_2$ from the at least one catalytic membrane reformer to a carbon capture and utilization unit.

In another aspect combinable with any of the previous aspects, the one or more fuel fluids includes at least one of liquefied petroleum gas, ammonia, or methane.

Another aspect combinable with any of the previous aspects further includes supplying hydrogen to the hydrogen-based PEM fuel cell assembly from one or more portable hydrogen fuel storage tanks.

In another example implementation, an off-grid power system includes a first renewable electrical power assembly configured to produce direct current (DC) electrical power from a first renewable source; a second renewable electrical power assembly configured to produce DC electrical power from a second renewable source; an electrical power circuit that electrically couples the first and second renewable electrical power assemblies together and changes the DC electrical power to at least one of a DC power supply or an alternating current (AC) power supply; and an off-grid hydrocarbon production or processing facility electrically coupled to the electrical power circuit to receive the at least one of the DC power supply or the AC power supply from the electrical power circuit.

In an aspect combinable with the example implementation, the first renewable electrical power assembly includes a photovoltaic (PV) system that includes one or more PV solar power cells, and the first renewable source includes solar energy.

In another aspect combinable with any of the previous aspects, the second renewable electrical power assembly includes a polymer exchange membrane (PEM) fuel cell assembly, and the second renewable source includes hydrogen fuel.

In another aspect combinable with any of the previous aspects, the electrical power circuit includes at least two of a DC/DC converter, a DC/AC inverter or an AC/AC transformer.

Another aspect combinable with any of the previous aspects further includes one or more batteries electrically coupled with the first and second renewable electrical power assemblies and the off-grid hydrocarbon production or processing facility through the electrical power circuit.

Implementations of an off-grid power system according to the present disclosure may include one or more of the following features. For example, an off-grid power system according to the present disclosure may provide for a higher efficiency (for example, 45% more efficient or more) and energy density for a remote, off-grid facility as compared to conventional power systems, such as solar only systems or solar with diesel generator secondary power systems. As another example, an off-grid power system according to the present disclosure may provide a greater overall efficiency as compared to conventional power systems, but also reduce battery capacity (for example, by about 60%) and system cost (for example, by about 30%). As a further example, an off-grid power system according to the present disclosure may provide significant improvement with respect to $CO_2$, $NO_x$ and particulate matter (PM) emissions as compared to conventional systems. In addition, an off-grid power system according to the present disclosure may utilizing a fuel (for example, hydrogen) that is produced directly produced by particular output from a remote facility, such as a hydrocarbon fuel directly extracted from remote hydrocarbon production facilities (for example, gas and oil wells). As another example, an off-grid power system according to the present disclosure may be portable (as well as modular and scalable) for relocation from one off-grid facility to another off-grid facility.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 3 illustrates a table that describes relative efficiencies and environmental impacts of different off-grid power systems according to the present disclosure.

DETAILED DESCRIPTION

Figure 1:
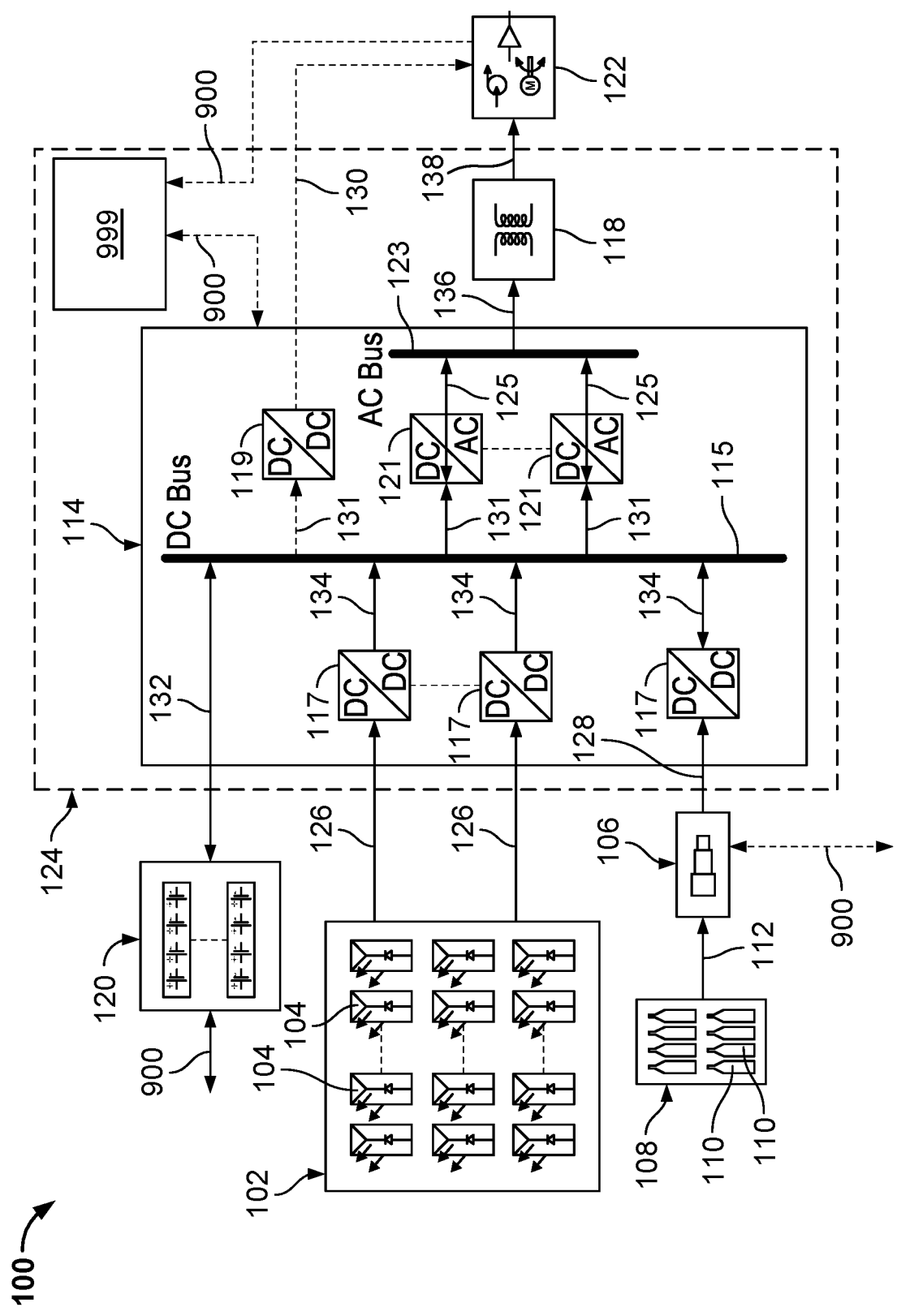
FIG. 1 is a schematic diagram of an example implementation of an off-grid power system according to the present disclosure.

FIG. 1 is a schematic diagram of an example implementation of an off-grid power system 100 according to the present disclosure. Generally, off-grid power system 100 is operational to provide electrical power (for example, only direct current (DC), only alternating current (AC), or both DC and AC power), and is electrically coupled, to a remote facility 122. Remote facility 122 may include any industrial process that utilizes electrical power and is electrically decoupled, for at least a portion of its operation, from a conventional distribution and transmission power grid. In some aspects, the remote facility 122 may be fully decoupled (for example, at all moments of operation) from the conventional distribution and transmission power grid. Further, the example remote facility 122 may be an industrial process in a variety of industries. For example, in some aspects, the remote facility 122 may be a remotely located hydrocarbon production or processing facility.

Examples of remotely located hydrocarbon production or processing facilities include well sites (for example, for unconventional and conventional wells), hydrocarbon fluid transfer or leak detections stations, pipeline valve and/or cathodic protection stations, water well injection sites, and other hydrocarbon facilities. In some aspects, the remote facility 122 may be located on a terranean surface or, alternatively, may be located on a body of water (for example, an ocean, gulf, sea, lake, river, fjord, or otherwise). Other examples of the remote facility 122 include "Tetra" (Terrestrial Trunked Radio) communication towers, as well as Global System for Mobile Communications (GSM) mobile network communication towers.

Generally, off-grid power system 100 may include multiple off-grid power sources that generate electrical power from, in some cases, renewable energy sources. For instance, in some aspects, the off-grid power system 100 may be operable to provide full time (for example, 24 hours a day, 7 days a week, 52 weeks of a year) electrical power to the remote facility 122 without interruption. In this example implementation, the off-grid power system 100 includes three off-grid power sources. Alternative implementations of the off-grid power system 100 may include fewer or more off-grid power sources.

As shown in FIG. 1, the off-grid power system 100 includes a solar power assembly 102 that includes one or more photovoltaic (PV) solar power cells 104. Generally, the PV solar power cells 104 convert solar energy to electrical power (for example, direct current (DC) electrical power) 126 by the photovoltaic effect through the exposure of the PV cells 104 to photons from the Sun. In some examples, the solar power assembly 102 may be sized to provide a full amount of required power to the remote facility 122 (for instance, all that is needed to fully operate the remote facility 122) during operational hours of the PV cells 104 (in other words, daytime operation). Alternatively, the solar power assembly 102 may be sized to provide less than a full amount of required power to the remote facility 122 during operational hours of the PV cells 104 (in other words, daytime operation) while other power sources of the off-grid power system 100 provide an additional amount of required power to the remote facility 122.

In this example, the off-grid power system 100 also includes a hydrogen-based polymer exchange membrane (PEM) fuel cell assembly 106. In some aspects, PEM fuel cell assembly 106 may include multiple assemblies 106 and are modular in nature. For example, each PEM fuel cell assembly 106 may include multiple PEM fuel cell generators. Generally, the PEM fuel cell assembly 106 is an electrochemical unit that produces electrical power (for example, DC electrical power) 128 without combustion using hydrogen and air as input fuel streams. In some aspects, the PEM fuel cell produces electrical power 128 without, for instance, any $CO_2$ or $NO_x$ emissions or particulate matter (PM) and produces water as a by-product.

As shown in this example, hydrogen 112 is supplied to the PEM fuel cell assembly 106 by one or more hydrogen storage tanks 110 as part of a hydrogen fuel source 108 that is fluidly coupled to the PEM fuel cell assembly 106. In some aspects, each of the hydrogen storage tanks 110 may be fillable (and re-fillable) with the hydrogen 112 to provide fuel for the PEM fuel cell assembly 106. In some aspects, hydrogen storage tanks 110 may be used as an alternative energy storage assembly to reduce the necessary capacity of electrical power storage assembly 120.

As further shown in FIG. 1, an electrical power storage assembly 120 is also provided, which can supply electrical power (for example, DC electrical power) 132. In some aspects, the electrical power storage assembly 120 includes or comprises one or more different types of energy storage systems or batteries (for example, lead-based or nickel-based, lithium-based, or various types of flow batteries) that can be charged (and discharged), for example, by one or both of the solar power assembly 102 or the PEM fuel cell assembly 106. In alternative aspects, the electrical power storage assembly 120 may include or comprise one or more super/ultra-capacitor banks to, for instance, fulfill intermittent loads with high inrush starting current at the remote facility 122. In some aspects, the electrical power 132 may be used by the remote facility 122 in place of or in addition to one or both of the electrical power 126 from the solar power assembly 102 or the electrical power 128 from the PEM fuel cell assembly 106.

The illustrated example of the off-grid power system 100 includes an electrical power circuit 124 that is comprised of one or more components and is operable to electrically couple the solar power assembly 102, the PEM fuel cell assembly 106, and the electrical power storage assembly 120 to the remote facility 122. For example, in this example, the electrical power circuit 124 includes power electronics 114, which in turn is electrically coupled to a transformer 118 (that is optional), which is electrically coupled to the remote facility 122.

In this example, the power electronics 114 is electrically coupled to the solar power assembly 102 to receive the electrical power 126 (for example, as DC power). The power electronics 114 is electrically coupled to the PEM fuel cell assembly 106 to receive the electrical power 128 (for example, as DC power). Further, the power electronics 114 is electrically coupled to the electrical power storage assembly 120 to receive the electrical power 132 (for example, as DC power). The power electronics 114 may include, for example, a control system 999 (that includes, for example, a solar charge or DC/DC controller 117) that is operable to control (at least partially) the operation of the solar power assembly 102 to generate the electrical power 126, fully or partially control of PEM fuel cell assembly 106, as well as control the electrical power storage assembly 120.

As shown in this example, the power electronics 114 may also include one or more DC/DC converters 117 that may, for example, convert DC power (for instance, electrical power 126 and electrical power 128) from one voltage level to another voltage level. The DC/DC converters are electrically coupled to provide converted DC power 134 to a DC bus 115, that is also electrically coupled to the electrical power storage assembly 120 to charge, for example, the batteries or capacitor bank.

The DC bus 115 also provides the converted DC power 134 to, for example, another DC/DC converter 119 and/or one or more DC/AC inverters 121 as DC power 131. In this example implementation, the DC/DC converter may convert DC power 131 to DC power 130 that is supplied to the remote facility 122 (for example, at a DC power level that matches a required DC power level of facility 122). The DC/AC inverters 121 convert the DC power 131 to AC power 125 that is supplied, in this example, to an AC bus 123.

In some aspects, the DC/AC inverters 121 use DC power 131 that is converted from DC power 126 during a day time period (for example, when sufficient solar energy is available), while DC/AC inverters 121 use DC power 131 that is converted from DC power 132 during evening and night time periods (for example, when insufficient solar energy is available). In some aspects, for example when there is insufficient DC power 126 and insufficient DC power 132 (regardless of day or night time period), DC power 128, which is converted to DC power 134 and fed to the DC power bus 134, may be used (for example, by DC/DC converter 119 and/or DC/AC inverter(s) 121) to, for instance, provide DC power 130 to the remote facility 122, provide AC power 125 to the AC bus 125, or provide DC power 132 to the electrical power storage assembly 120 to charge the batteries or capacitor banks (or a combination thereof). For instance, if excess DC power 128 (and converted DC power 134) is available from the PEM fuel cell assembly 106, then one or both of DC power 130 or AC power 125 may be provided, as well as DC power 132 to the electrical power storage assembly 120 from the DC bus 115.

In some aspects, the remote facility 122 may operate with only DC power. In such cases, the DC/AC inverters 121 may not be used in the system 100. In some aspects, the power electronics 114 can be scalable with more redundant assemblies of charge controllers, DC/DC converters, and DC/AC inverters, which may operate in parallel for higher reliability based on the remote facility 122 classification (critical or non-critical).

As shown in this example, the AC bus 123 is electrically coupled to provide AC power 136 to a transformer 118. For example, in this example implementation, the off-grid power system 100 includes one or more transformers 118 that is electrically coupled between the AC bus 123 and the remote facility 122. In some examples, the transformer 118 may be operable to convert the AC power 136 from one voltage level to another voltage level to provide AC power 138 to the remote facility 122. For example, if electrical power 136 is at a particular voltage level lower than a voltage level of the remote facility 122, then the transformer 118 may step up AC power 136 to AC power 138 provided to the remote facility 122. If AC power 136 is at a particular voltage level greater than a voltage level of the remote facility 122, then the transformer 118 may step down AC power 136 to AC power 138 provided to the remote facility 122. If AC power 136 is at a particular voltage level the same as a voltage level of the remote facility 122, then the transformer 118 may not be included or may not be operated.

As shown in the example implementation of off-grid power system 100, a control system (or controller) 999 is communicably coupled through signals 900 to one or more of the illustrated components of the system 100. In some implementations, the control system 999 is a microprocessor-based control system that includes one or more hardware processors, one or more memory modules communicably coupled to the hardware processor(s), and instructions and data encoded on the one or more memory modules. The hardware processor(s) are operable to execute the instructions to perform operations, including operations described in the present disclosure. As shown in this example (for example, by the bi-directional signals 900), the control system 999 may be communicably coupled (wired or wirelessly) to, for instance, the solar power assembly 102, the PEM fuel cell assembly 106, the electrical power storage assembly 120 and partial or complete set of components of the electrical power circuit 124, as well as one or more sensors including weather station, energy demand meter at the remote facility 122 (for example, time of day, weather irradiance, wind speed, ambient temperature, PV cell temperature, humidity, dust sensors, hydrogen fuel usage, energy storage temperature, charge and discharge voltage, current, power, or otherwise) positioned in the electrical connections of the system 100.

In some aspects, the signals 900 may represent commands from the control system 999 to one or more of the solar power assembly 102, the PEM fuel cell assembly 106, the electrical power storage assembly 120, and partial or complete set of components and sensors of the electrical power circuit 124. In some aspects, the signals 900 may represent feedback (for example, time of day, weather, current, voltage, or power) or measurements from solar power assembly 102, the PEM fuel cell assembly 106, the electrical power storage assembly 120, the remote facility 122, and partial or complete set of components of the electrical power circuit 124 (including solar power assembly 102 robotic cleaning components), or one or more sensors positioned in or on one or more components of the off-grid power system 100 to the control system 999. In some aspects, energy demand meters to measure real time power demand of the remote facility 122, weather stations to measure solar radiation, ambient temperature, the solar power assembly 102 cell temperature, wind speed and the solar power assembly 102 soiling measurements may be collected and used by the control system 999. In addition, operational condition data of the illustrated components of system 100 can be monitored (for example, with alarms or warnings).

In an example operation of off-grid power system 100, electrical power may be provided at all times to the remote facility 122 by at least one of the solar power assembly 102, the PEM fuel cell assembly 106, or the electrical power storage assembly 120. For example, during a daytime operation of the remote facility 122, or otherwise at a time period in which sufficient solar energy is present, the solar power assembly 102 may provide electrical power 126 to the power electronics 114, in which DC/DC converters 117 convert DC power 126 (up or down) to DC power 134. The converted DC power 134 (as well as DC power 132) may be provided to the DC power bus 115 and transmitted thru the DC/DC converter 119 (as DC power 131) to the remote facility 122 as DC power 130. Additionally or alternatively, DC power 131 may be inverted to AC power 125 with DC/AC inverters 121 and transmitted thru the AC power 125 to the AC bus 123, which in turn provides AC power 136 to the remote facility 122 as AC power 138 (or AC power 136 is transformer 118 is not needed).

If electrical power 126 is more than required by remote facility 122, a portion of the electrical power 126 may be provided through the power electronics 114 to charge (or re-charge) the electrical power storage assembly 120. If electrical power 126 is less than required by remote facility 122, all or a portion of the electrical power 132 from the electrical power storage assembly 120 may be provided through the power electronics 114 (and inverted, voltage converted, if necessary) to subsidize the electrical power 126 to provide the DC power 130 or AC power 138 (or both). AC power 138 may be provided through, if necessary, transformed by the transformer 118 from AC power 136. If electrical power 126 is less than required by remote facility 122, all or a portion of the DC power 128 via the PEM fuel cell assembly 106 may be provided through the power electronics 114 (and inverted, voltage converted if necessary) to the transformer 118 (if necessary) as AC power 136 or DC power 130 to the remote facility 122 to subsidize the electrical power 126.

In a night time operation, or otherwise when sufficient electrical power 126 is not produced by the solar power assembly 102 and/or there is insufficient stored energy at the electrical power storage assembly 120, the PEM fuel cell assembly 106 may produce DC power 128, which may be inverted and/or voltage converted by power electronics 114 (if necessary) and provided as DC power 130 and/or AC power 136 through the transformer 118 (if necessary). The transformer 118 may transform AC power 136 (if necessary) and provide AC power 138 to the remote facility 122. If DC power 128 is more than required by remote facility 122, a portion of the DC power 128 may be provided through the power electronics 114 by voltage conversion via one of more DC/DC converters 117 to charge (or re-charge) the electrical power storage assembly 120 via DC power 132.

Alternatively or additionally, in a night time operation, or otherwise when sufficient electrical power 126 is not produced by the solar power assembly 102, the electrical power storage assembly 120 may discharge or otherwise supply electrical power 132, which may be inverted and/or voltage converted by power electronics 114 (if necessary) and provided as DC power 130 directly to the remote facility 122 and/or AC power 136 to the transformer 118 (if necessary). The transformer 118 may transform AC power 136 (if necessary) and provide AC power 138 to the remote facility 122.

In some aspects, decisions on which power source (for example, the solar power assembly 102, the PEM fuel cell assembly 106, the electrical power storage assembly 120, or a combination thereof) is utilized to provide DC power 130 and/or AC power 136 to the remote facility 122 may be made and controlled by the control system 999 through signals 900. For example, control system 999 may implement an energy management system that optimizes power demand and energy utilization effectively and improves operational reliability and minimizes overall operational cost.

Figure 2:
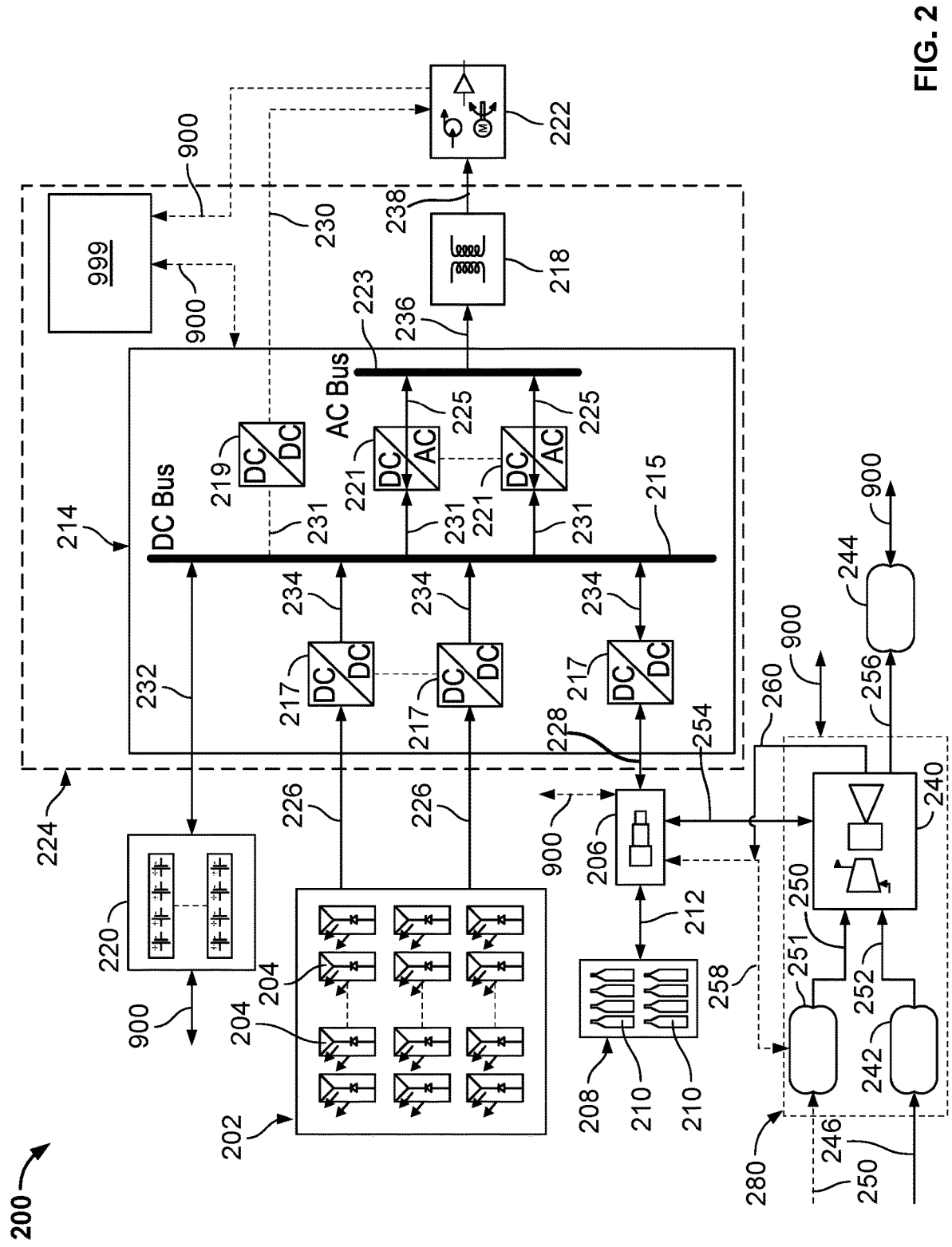
FIG. 2 is a schematic diagram of another example implementation of an off-grid power system according to the present disclosure.

FIG. 2 is a schematic diagram of another example implementation of an off-grid power system 200 according to the present disclosure. Generally, off-grid power system 200 is operational to provide electrical power (and is electrically coupled to) a remote facility 222. In some aspects, off-grid power system 200 differs from off-grid power system 100 in that hydrogen fuel for a PEM fuel cell assembly is produced at the location of the off-grid power system 200 (in other words, at or near the remote facility 222). Thus, on-site hydrogen production instead of portable hydrogen storage is used to supply the hydrogen fuel. The on-site production of hydrogen may have some advantages. For example, by utilizing on-site production of hydrogen, excess power produced by a solar power assembly may be converted to hydrogen and stored on-site. By utilizing one or more reversible polymer exchange membrane (PEM) and/or solid oxide fuel cells, hydrogen can be produced from excess power like an electrolyzer and/or by using onsite hydrocarbon reformer. Further, by applying on-site hydrogen production, operational costs of the off-grid power system 200 may be reduced, but there also may be a reduction on overall system efficiency compared to the use of compressed hydrogen storage tanks. In some aspects, such a feature may save a delivery cost of hydrogen accounting for an expensive portion (for example, up to one-third cost) in a hydrogen fuel price.

Remote facility 222 may include any industrial process that utilizes electrical power and is electrically decoupled, for at least a portion of its operation, from a conventional distribution and transmission power grid. In some aspects, the remote facility 222 may be fully decoupled (for example, at all moments of operation) from the conventional distribution and transmission power grid. Further, the example remote facility 222 may be an industrial process in a variety of industries. For example, in some aspects, the remote facility 222 may be a remotely located hydrocarbon production or processing facility.

Examples of remotely located hydrocarbon production or processing facilities include well sites (for example, for unconventional and conventional wells), hydrocarbon fluid transfer or leak detections stations, pipeline valve and/or cathodic protection stations, water well injection sites, and other hydrocarbon facilities. In some aspects, the remote facility 222 may be located on a terranean surface or, alternatively, may be located on a body of water (for example, an ocean, gulf, sea, lake, river, fjord, or otherwise). Other examples of the remote facility 222 include "Tetra" (Terrestrial Trunked Radio) communication towers, as well as Global System for Mobile Communications (GSM) mobile network communication towers.

Generally, off-grid power system 200 may include multiple off-grid power sources that generate electrical power from, in some cases, renewable energy sources. For instance, in some aspects, the off-grid power system 200 may be operable to provide full time (for example, 24 hours a day, 7 days a week, 52 weeks of a year) electrical power to the remote facility 222 without interruption. In this example implementation, the off-grid power system 200 includes three off-grid power sources. Alternative implementations of the off-grid power system 200 may include fewer or more off-grid power sources.

As shown in FIG. 2, the off-grid power system 200 includes a solar power assembly 202 that includes one or more photovoltaic (PV) solar power cells 204. Generally, the PV solar power cells 204 convert solar energy to electrical power (for example, direct current (DC) electrical power) 226 by the photovoltaic effect through the exposure of the PV cells 204 to photons from the Sun. In some examples, the solar power assembly 202 may be sized to provide a full amount of required power to the remote facility 222 (for instance, all that is needed to fully operate the remote facility 222) during operational hours of the PV cells 204 (in other words, daytime operation). Alternatively, the solar power assembly 202 may be sized to provide less than a full amount of required power to the remote facility 222 during operational hours of the PV cells 204 (in other words, daytime operation) while other power sources of the off-grid power system 200 provide an additional amount of required power to the remote facility 222.

In this example, the off-grid power system 200 also includes a hydrogen-based polymer exchange membrane (PEM) fuel cell assembly 206. Generally, the PEM fuel cell assembly 206 is an electrochemical unit that produces electrical power (for example, DC electrical power) 228 without combustion using hydrogen (or LPG or methane) and air as input fuel streams. In some aspects, the PEM fuel cell produces electrical power 228 without, for instance, any $CO_2$ or $NO_x$ emissions or PM and produces water as a by-product.

As shown in this example, hydrogen 212 may be supplied to the PEM fuel cell assembly 206 by one or more hydrogen storage tanks 210 as part of a hydrogen fuel source 208 that is fluidly coupled to the PEM fuel cell assembly 206. In some aspects, each of the hydrogen storage tanks 210 may be fillable (and re-fillable) with the hydrogen 212 to provide fuel for the PEM fuel cell assembly 206. In some aspects, hydrogen 212 may be transferred from the hydrogen fuel source 208 to the PEM fuel cell assembly 206 to produce power and, in reverse, hydrogen 212 may be provided to the hydrogen fuel source 208 by producing hydrogen by water electrolysis with the PEM fuel cell assembly 206 using solar power.

Hydrogen 254 may also be supplied to the PEM fuel cell assembly 206 through a hydrogen fuel production assembly 280. The hydrogen fuel production assembly 280 includes, as shown in this example, a multi-fuel pre-reformer 242 and a catalytic membrane reformer 240. In this example implementation, the multi-fuel pre-reformer 242 receives a fuel 246 (such as liquefied petroleum gas (LPG), ammonia, or methane) and water 250 (for example, for LPG or methane as fuel 246). As shown in this example, the water 250 may be provided to water tank 251. In some aspects, the fuel 246 may be received from the remote facility 222, such as a remote facility 222 that includes a hydrocarbon production or processing facility that produces (or processes) LPG or methane or ammonia by catalytic decomposition.

In the multi-fuel pre-reformer 242, the fuel 246 is converted into a pre-reformed gas 252 of methane rich gas or a mixture of hydrogen ($H_2$), $CO_2$ with nitrogen ($N_2$) (for example, at 500–600° C. and 20–40 bars). The pre-reformed gas 252 is then provided to the catalytic membrane reformer 240, in which the gas 252 is substantially or completely converted to hydrogen in the catalytic membrane reformer 240. In this example implementation with the catalytic membrane reformer 240, hydrogen 254 is produced and separated (from other elements) simultaneously, which can shift thermodynamic limits and promote the reaction kinetics, and as a result, obtain complete conversions. In some aspects, by applying a two-step reforming process as described, the hydrogen fuel production assembly 280 can produce 99.99% hydrogen from various fuels such as LPG, ammonia and methane without a further post-polishing process. The hydrogen 254 may then be provided to the PEM fuel cell assembly 206 as fuel. As described, therefore, the combination of the hydrogen fuel production assembly 280 and the PEM fuel cell assembly 206 may provide for a reversible fuel-cell system (RFC), such as a reversible polymer exchange membrane fuel cell (RPEMFC) assembly 206 instead of a conventional PEM fuel cell assembly.

For example, turning briefly to FIG. 3, this figure illustrates a table 300 that describes relative efficiencies and environmental impacts of different off-grid power systems according to the present disclosure. As shown in table 300, three different off-grid power sources are compared in efficiency, $CO_2$ emissions into the atmosphere, NOR emissions into the atmosphere, and PM emissions into the atmosphere. One such off-grid power source is a conventional diesel engine generator (row one of table 300). Another such off-grid power source is PEM fuel cell assembly 106 (row two of table 300) with compressed hydrogen gas cylinder. Another such off-grid power source is onsite hydrogen reformer integrated with PEM fuel cell assembly 206 (row three of table 300). As shown in table 300 (and with respect to certain conditions shown as (1)-(6)), the second case of using compressed hydrogen gas cylinder with PEM fuel cell 106 is the most efficient off-grid power source while producing no NOR or PM emissions. The PEM fuel cell assembly 206 with on-site hydrogen production with reformer integration is the second most efficient off-grid power source while producing no $CO_2$, $NO_x$, or PM emissions. The diesel engine generator is the least efficient off-grid power source while producing significant $CO_2$, $NO_x$, and PM emissions.

In this example implementation, the catalytic membrane reformer 240 is also fluidly coupled to a carbon capture and utilization unit 244. A carbon dioxide fluid 256 is provided from the catalytic membrane reformer 240 to the carbon capture and utilization unit 244. The unit 244 may therefore capture the carbon dioxide fluid 256 (rather than allow it to go into the atmosphere) and use it, such as for injection purposes in secondary $CO_2$-EOR (enhanced oil recovery) operations.

A water stream 260 may also be provided from the catalytic membrane reformer 240. In some aspects, the water stream 260 may be provided to the PEM fuel cell assembly 206. Additionally or alternatively, the water stream 260 may be provided to water tank 251 as water stream 258. The water stream 258 (or a separate water stream) may also provide water from the water tank to the PEM fuel cell assembly 206. In some aspects, water produced from the PEM fuel cell assembly 206, the catalytic membrane reformer 240, or both, can be recollected and provided to the water tank 251 as water stream 258 (or a separate water stream).

As further shown in FIG. 2, an electrical power storage assembly 220 is also provided, which can supply electrical power (for example, DC electrical power) 232. In some aspects, the electrical power storage assembly 220 includes or comprises one or more batteries (for example, lead-based or nickel based, lithium-based, or various types of flow batteries) that can be charged (and discharged), for example, by one or both of the solar power assembly 202 or the PEM fuel cell assembly 206. In alternative aspects, the electrical power storage assembly 220 may include or comprise one or more super/ultra-capacitor banks to, for instance, fulfill intermittent loads with high inrush starting current at the remote facility 222. In some aspects, the electrical power 232 may be used by the remote facility 222 in place of or in addition to one or both of the electrical power 226 from the solar power assembly 202 or the electrical power 228 from the PEM fuel cell assembly 206.

The illustrated example of the off-grid power system 200 includes an electrical power circuit 224 that is comprised of one or more components and is operable to electrically couple the solar power assembly 202, the PEM fuel cell assembly 206, and the electrical power storage assembly 220 to the remote facility 222. For example, in this example, the electrical power circuit 224 includes power electronics 214, which in turn is electrically coupled to a transformer 218 (that is optional), which is electrically coupled to the remote facility 222.

In this example, the power electronics 214 is electrically coupled to the solar power assembly 202 to receive the electrical power 226 (for example, as DC power). The power electronics 214 is electrically coupled to the PEM fuel cell assembly 206 to receive the electrical power 228 (for example, as DC power). Further, the power electronics 214 is electrically coupled to the electrical power storage assembly 220 to receive the electrical power 232 (for example, as DC power). The power electronics 214 may include, for example, a control system 999 (that includes, for example, a solar charge or DC/DC controller 217) that is operable to control (at least partially) the operation of the solar power assembly 202 to generate the electrical power 226, fully or partially control of PEM fuel cell assembly 206, as well as control the electrical power storage assembly 220.

As shown in this example, the power electronics 214 may also include one or more DC/DC converters 217 that may, for example, convert DC power (for instance, electrical power 226 and electrical power 228) from one voltage level to another voltage level. The DC/DC converters are electrically coupled to provide converted DC power 234 to a DC bus 215, that is also electrically coupled to the electrical power storage assembly 220 to charge, for example, the batteries or capacitor bank.

The DC bus 215 also provides the converted DC power 234 to, for example, another DC/DC converter 219 and/or one or more DC/AC inverters 221 as DC power 231. In this example implementation, the DC/DC converter may convert DC power 231 to DC power 230 that is supplied to the remote facility 222 (for example, at a DC power level that matches a required DC power level of facility 222). The DC/AC inverters 221 convert the DC power 231 to AC power 225 that is supplied, in this example, to an AC bus 223.

In some aspects, the DC/AC inverters 221 use DC power 231 that is converted from DC power 226 during a day time period (for example, when sufficient solar energy is available), while DC/AC inverters 221 use DC power 231 that is converted from DC power 232 during evening and night time periods (for example, when insufficient solar energy is available). In some aspects, for example when there is insufficient DC power 226 and insufficient DC power 232 (regardless of day or night time period), DC power 228, which is converted to DC power 234 and fed to the DC power bus 215, may be used (for example, by DC/DC converter 219 and/or DC/AC inverter(s) 221) to, for instance, provide DC power 230 to the remote facility 222, provide AC power 225 to the AC bus 223, or provide DC power 232 to the electrical power storage assembly 220 to charge the batteries or capacitor banks (or a combination thereof). For instance, if excess DC power 228 (and converted DC power 234) is available from the PEM fuel cell assembly 206, then one or both of DC power 230 or AC power 225 may be provided, as well as DC power 232 to the electrical power storage assembly 220 from the DC bus 215.

In some aspects, the remote facility 222 may operate with only DC power. In such cases, the DC/AC inverters 221 may not be used in the system 200. In some aspects, the power electronics 214 can be scalable with more redundant assemblies of charge controllers, DC/DC converters, and DC/AC inverters, which may operate in parallel for higher reliability based on the remote facility 222 classification (critical or non-critical).

As shown in this example, the AC bus 223 is electrically coupled to provide AC power 236 to a transformer 218. For example, in this example implementation, the off-grid power system 200 includes one or more transformers 218 that is electrically coupled between the AC bus 223 and the remote facility 222. In some examples, the transformer 218 may be operable to convert the AC power 236 from one voltage level to another voltage level to provide AC power 238 to the remote facility 222. For example, if electrical power 236 is at a particular voltage level lower than a voltage level of the remote facility 222, then the transformer 218 may step up AC power 236 to AC power 238 provided to the remote facility 222. If AC power 236 is at a particular voltage level greater than a voltage level of the remote facility 222, then the transformer 218 may step down AC power 236 to AC power 238 provided to the remote facility 222. If AC power 236 is at a particular voltage level the same as a voltage level of the remote facility 222, then the transformer 218 may not be included or may not be operated.

As shown in the example implementation of off-grid power system 200, a control system (or controller) 999 is communicably coupled through signals 900 to one or more of the illustrated components of the system 200. In some implementations, the control system 999 is a microprocessor-based control system that includes one or more hardware processors, one or more memory modules communicably coupled to the hardware processor(s), and instructions and data encoded on the one or more memory modules. The hardware processor(s) are operable to execute the instructions to perform operations, including operations described in the present disclosure. As shown in this example (for example, by the bi-directional signals 900), the control system 999 may be communicably coupled (wired or wirelessly) to, for instance, the solar power assembly 202, the PEM fuel cell assembly 206, the hydrogen fuel production assembly 280, the electrical power storage assembly 220, and partial or complete set of components of the electrical power circuit 224, as well as one or more sensors including weather station, energy demand meter at the remote facility 222 (for example, time of day, weather irradiance, wind speed, ambient temperature, PV cell temperature, humidity, dust sensors, hydrogen fuel usage, energy storage temperature, charge and discharge voltage, current, power, or otherwise) positioned in the electrical connections of the system 200.

In some aspects, the signals 900 may represent commands from the control system 999 to one or more of the solar power assembly 202, the PEM fuel cell assembly 206, the hydrogen fuel production assembly 280, the electrical power storage assembly 220, and partial or complete set of components and sensors of the electrical power circuit 224. In some aspects, the signals 900 may represent feedback (for example, time of day, weather, current, voltage, power, fuel amount, available tank storage capacity) or measurements from solar power assembly 202, the PEM fuel cell assembly 206, the hydrogen fuel production assembly 280, the electrical power storage assembly 220, the remote facility 222, and one or more components of the electrical power circuit 224 (including solar power assembly 202 robotic cleaning components), or one or more sensors positioned in or on one or more components of the off-grid power system 200 to the control system 999. In some aspects, energy demand meters to measure real time power demand of the remote facility 222, weather stations to measure solar radiation, ambient temperature, the solar power assembly 202 cell temperature, wind speed and the solar power assembly 202 soiling measurements may be collected and used by the control system 999. In addition, operational condition data of the illustrated components of system 200 can be monitored (for example, with alarms or warnings).

In an example operation of off-grid power system 200, electrical power may be provided at all times to the remote facility 222 by at least one of the solar power assembly 202, the PEM fuel cell assembly 206, or the electrical power storage assembly 220. For example, during a daytime operation of the remote facility 222, or otherwise at a time period in which sufficient solar energy is present, the solar power assembly 202 may provide electrical power 226 to the power electronics 214, in which DC/DC converters 217 convert DC power 226 (up or down) to DC power 234. The converted DC power 234 (as well as DC power 232) may be provided to the DC power bus 215 and transmitted thru the DC/DC converter 219 (as DC power 231) to the remote facility 222 as DC power 230. Additionally or alternatively, DC power 231 may be inverted to AC power 225 with DC/AC inverters 221 and transmitted thru the AC power 225 to the AC bus 223, which in turn provides AC power 236 to the remote facility 222 as AC power 238 (or AC power 236 is transformer 218 is not needed).

If electrical power 226 is more than required by remote facility 222, a portion of the electrical power 226 may be provided through the power electronics 214 to charge (or re-charge) the electrical power storage assembly 220. If electrical power 226 is less than required by remote facility 222, all or a portion of the electrical power 232 from the electrical power storage assembly 220 may be provided through the power electronics 214 (and inverted, voltage converted, if necessary) to subsidize the electrical power 226 to provide the DC power 230 or AC power 238 (or both). AC power 238 may be provided through, if necessary, transformed by the transformer 218 from AC power 236. If DC power 226 is less than required by remote facility 222, all or a portion of the DC power 228 may be provided through the power electronics 214 (and inverted, voltage converted if necessary) to the transformer 218 (if necessary) as AC power 236 or DC power 232 to the remote facility 222 to subsidize the electrical power 226.

In a night time operation, or otherwise when sufficient electrical power 226 is not produced by the solar power assembly 202 and/or there is insufficient stored energy at the electrical power storage assembly 220, the PEM fuel cell assembly 206 may produce DC power 228, which may be inverted and/or voltage converted by power electronics 214 (if necessary) and provided as DC power 230 and/or AC power 238 through the transformer 218 (if necessary). The transformer 218 may transform AC power 236 (if necessary) and provide AC power 238 to the remote facility 222. If DC power 228 is more than required by remote facility 222, a portion of the DC power 228 may be provided through the power electronics 214 by voltage conversion to charge (or re-charge) the electrical power storage assembly 220 via DC power 232.

Alternatively or additionally, in a night time operation, or otherwise when sufficient electrical power 226 is not produced by the solar power assembly 202, the electrical power storage assembly 220 may discharge or otherwise supply electrical power 232, which may be inverted and/or voltage converted by power electronics 214 (if necessary) and provided as DC power 230 directly to the remote facility 222 and/or AC power 236 to the transformer 218 (if necessary). The transformer 218 may transform AC power 236 (if necessary) and provide AC power 238 to the remote facility 222.

In some aspects, decisions on which power source (for example, the solar power assembly 202, the PEM fuel cell assembly 206, the electrical power storage assembly 220, or a combination thereof) is utilized to provide DC power 230 and/or AC power 236 to the remote facility 222 may be made and controlled by the control system 999 through signals 900. For example, control system 999 may implement an energy management system that optimizes power demand and energy utilization effectively and improves operational reliability and minimizes overall operational cost.

Figure 4:
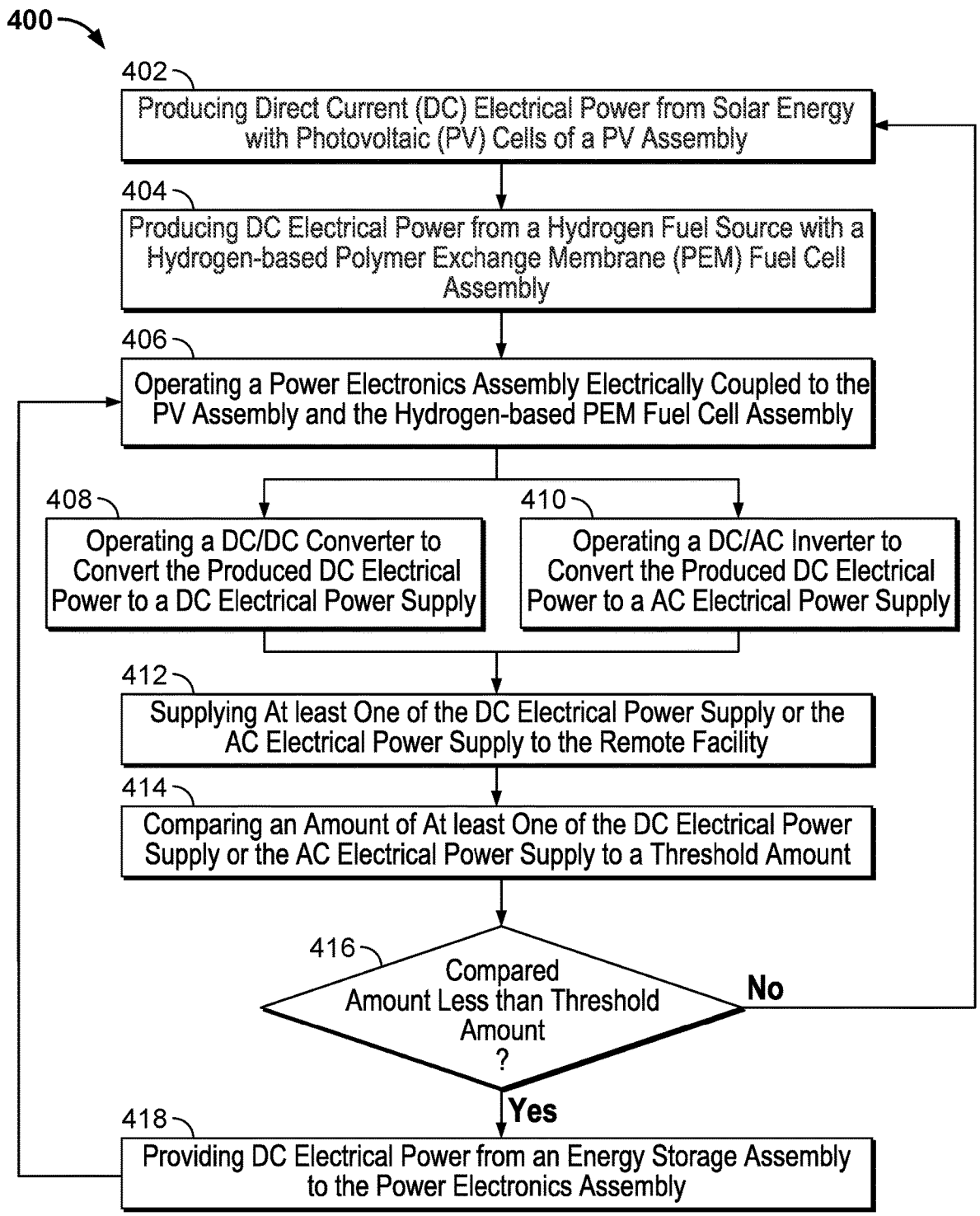
FIG. 4 illustrates a flowchart of an example method of operation of an off-grid power system according to the present disclosure.

FIG. 4 illustrates a flowchart of an example method 400 of operation of an off-grid power system according to the present disclosure. In some aspects, method 400 may be executed by the off-grid power system 100, the off-grid power system 200, or another off-grid power system according to the present disclosure. Method 400 may begin at step 402, which includes producing direct current (DC) electrical power from solar energy with photovoltaic (PV) cells of a PV assembly. For example, solar energy may be converted into electrical power (typically DC power) by the poly or mono crystalline solar PV power cells. In some aspects, the PV assembly is at or near a remote facility that is disconnected (for example, all or partially) from a power transmission and distribution power grid. Thus, the PV assembly generates electrical power independent of a power grid, and the remote facility may be disconnected from the power grid.

Method 400 may continue at step 404, which includes producing DC electrical power from a hydrogen fuel source with a hydrogen-based polymer exchange membrane (PEM) fuel cell assembly. For example, the PEM fuel cell may use a hydrogen fuel, either stored in portable tanks or generated at or near the remote facility (or both) to generate off-grid electrical power. The hydrogen fuel may be produced on-site, for example, by a multi-fuel pre-reformer and catalytic membrane reformer that operate in combination to convert a fuel (such as a hydrocarbon fuel produced or processed at the remote facility) into hydrogen. In some aspects, the electrical power generated by the PEM fuel cell (or a reversible polymer exchange membrane fuel cell) may be DC electrical power.

Method 400 may continue at step 406, which includes operating a power electronics assembly electrically coupled to the PV assembly and the hydrogen-based PEM fuel cell assembly. For example, the PV assembly and PEM fuel cell assembly may both be electrically coupled to a power electronics assembly that includes at least one DC/DC converter and at least one DC/AC inverter, as well as other components such as a DC power bus, an AC power bus, voltage regulators and other components. In some aspects, the power electronics assembly includes one or more transformers that convert AC electrical power at a particular voltage to AC electrical power at another voltage (for example, to match a required voltage level of the remote facility.

In some aspects, method 400 may continue from step 406 to step 408, which includes operating a DC/DC converter to convert the produced DC electrical power to a DC electrical power supply. For example, in some aspects, the remote facility may use only DC electrical power or may use DC electrical power along with AC electrical power. DC electrical power generated by one or both of the PV assembly or PEM fuel cell assembly may be, for example, converted to a DC electrical power supply by one or more DC/DC converters of the power electronics assembly. The converted DC electrical power may be supplied to a DC power bus that is electrically coupled to the remote facility. In some aspects, the converted DC electrical power from the DC power bus may be further converted (for example, by one or more additional DC/DC converters) prior to being provided to the remote facility. In some aspects, step 408 may also include supplying excess DC electrical power (in other words, power beyond what is required at the remote facility) to charge (or re-charge) an energy storage device (capacitors, batteries) through the DC power bus of the power electronics assembly.

In some aspects, method 400 may continue from step 406 to step 410, which includes operating a DC/AC inverter to convert the produced DC electrical power to an AC electrical power supply. For example, in some aspects, the remote facility may use only AC electrical power or may use AC electrical power along with DC electrical power. DC electrical power generated by one or both of the PV assembly or PEM fuel cell assembly may be, for example, converted to a DC electrical power supply by one or more DC/DC converters of the power electronics assembly. The converted DC electrical power may be supplied to a DC power bus that is electrically coupled to the remote facility. Converted DC electrical power from the DC power bus may then be provided to one or more DC/AC inverters to generate an AC electrical power supply. In some aspects, the converted DC electrical power from the DC power bus may be further converted (for example, by one or more additional DC/DC converters) prior to being inverted by the DC/AC inverter(s). In some aspects, step 410 may also include supplying excess DC electrical power (in other words, power beyond what is required at the remote facility) to charge (or re-charge) an energy storage device (capacitors, batteries) through the DC power bus of the power electronics assembly. Step 410 may also include, in some aspects, transforming the AC electrical power supply from one voltage level to another voltage level by one or more transformers of the power electronics assembly.

In some aspects, both steps 408 and 410 are performed (in parallel or in series) after step 406. For example, in a case where the remote facility utilizes both DC electrical power and AC electrical power, steps 408 and 410 may be performed subsequent to step 406.

Method 400 may continue after step 408 or step 410 (or both) with step 412, which includes supplying at least one of the DC electrical power supply or the AC electrical power supply to a remote facility. For example, the DC electrical power supply from step 408 may be provided to the DC power loads of the remote facility. In addition or alternatively, the AC electrical power supply from step 410 may be provided to the AC power loads of the remote facility.

Method 400 may continue at step 414, which includes comparing an amount of at least one of the DC electrical power supply or the AC electrical power supply to a threshold amount. For example, the DC electrical power supply at the DC power bus, or an amount of DC electrical power from the PV assembly, or an amount of DC electrical power from the PEM fuel cell assembly (or a combination thereof) may be measured or estimated and compared against a threshold DC power value. Additionally or alternatively, the AC electrical power supply at the AC power bus may be measured or estimated and compared against a threshold AC power value. Thus, step 414 may include the comparison of available DC electrical power to a DC power threshold (for example, an amount of DC power sufficient to operate the DC power loads of the remote facility). Step 414 may additionally or alternatively include the comparison of available AC electrical power to an AC power threshold (for example, an amount of AC power sufficient to operate the AC power loads of the remote facility).

Method 400 may continue at step 416, which includes a determination if the compared amount (of DC power, AC power, or both) is less than the threshold amount. If the determination is no, then method 400 may revert to step 402. For instance, if the amount of available power (DC, AC, or both) from the PV assembly and/or PEM fuel cell assembly is sufficient, then one or both assemblies may continue operating to provide electrical power to the remote facility (in steps 402-412). In some aspects, a no determination may indicate that operation is during day time (or when an amount of available solar energy is sufficient to generate electrical power for the remote facility). In some aspects, the supply of electrical power to the remote facility as generated by the PV assembly may be a primary, daytime power source.

If the determination in step 416 is yes, then method 400 may continue to step 418, which includes providing DC electrical power from an energy storage assembly to the power electronics assembly. For example, one or more batteries or super capacitors of the energy storage assembly may provide stored DC electrical power to the power electronics assembly. Method 400 may then continue back at step 406, with the DC electrical power supplied by the energy storage assembly to the power electronics assembly being used in steps 408-412.

In some aspects, a determination of yes in step 416 may indicate that there is insufficient solar energy for the PV assembly (for example, night time operation) and there is insufficient electrical power generated by the PEM fuel cell assembly. Thus, in some aspects, although there may be insufficient solar energy for the PV assembly (for example, night time operation), there is still sufficient electrical power generated by the PEM fuel cell assembly to power the remote facility. In such a case, the determination in step 416 would be no and the method would revert to step 402 (with the method skipping step 402 and proceeding to step 404). Thus, the determination of yes in step 416 may indicate that backup electrical power (for example, from the energy storage assembly) is required to provide electrical power (DC electrical power, AC electrical power, or both) to the remote facility.

Figure 5:
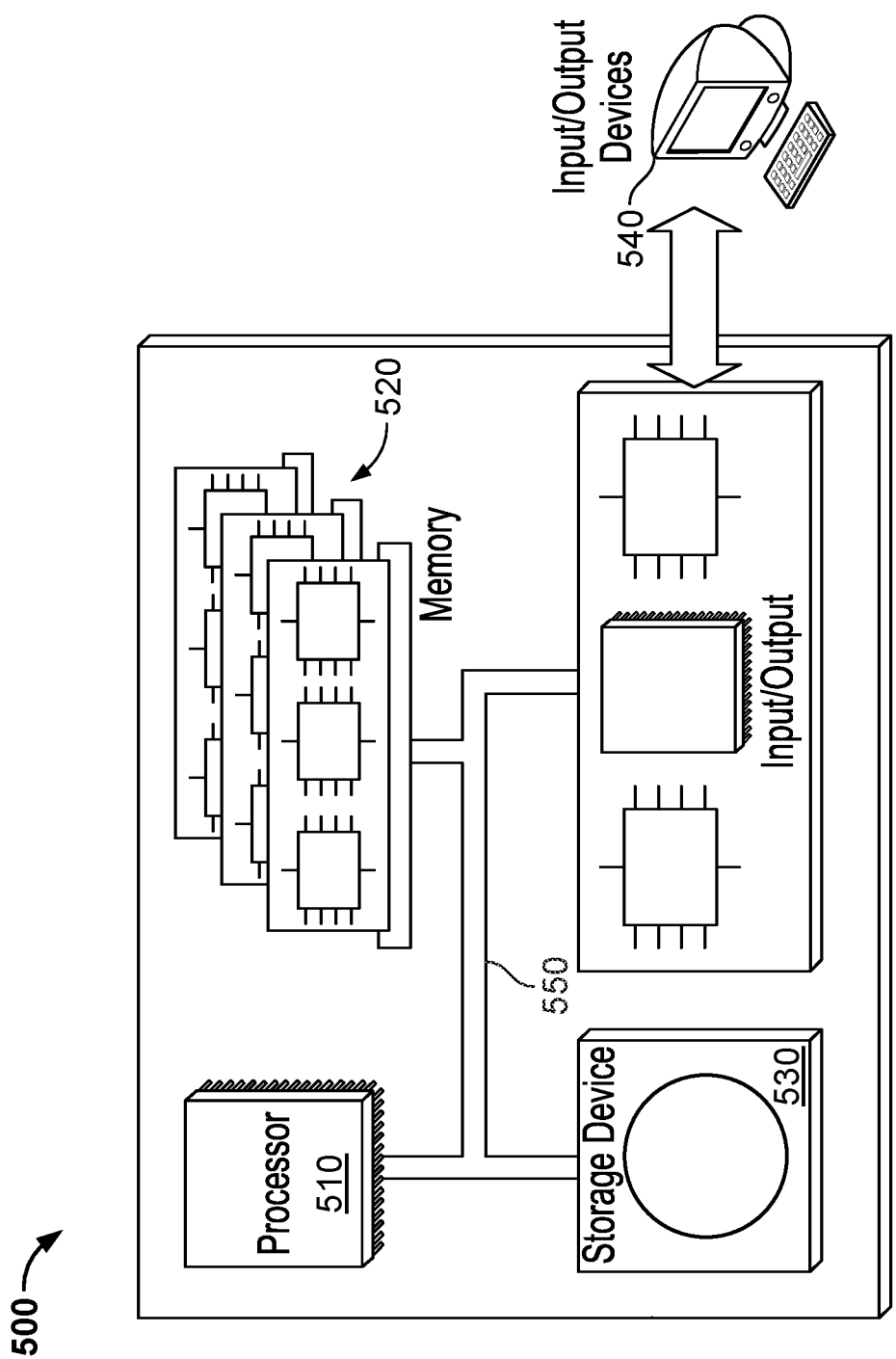
FIG. 5 is a schematic illustration of an example controller (or control system) for controlling operations of an off-grid power system according to the present disclosure.

FIG. 5 is a schematic illustration of an example controller 500 (or control system) for controlling operations of an off-grid power system according to the present disclosure. For example, the controller 500 may include or be part of the control system 999 shown in FIGS. 1 and 2. The controller 500 is intended to include various forms of digital computers, such as printed circuit boards (PCB), processors, digital circuitry, or otherwise parts of an off-grid power system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540. Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the controller 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, or a tape device.

The input/output device 540 provides input/output operations for the controller 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as an LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A power system, comprising:
   a photovoltaic (PV) assembly that comprises a plurality of PV cells configured to produce direct current (DC) electrical power from solar energy;
   a hydrogen-based polymer exchange membrane (PEM) fuel cell assembly configured to produce DC electrical power from a hydrogen fuel source, the hydrogen fuel source comprising one or more portable hydrogen fuel storage tanks;
   a power electronics assembly comprising at least one of:
      at least one DC/DC converter configured to convert the produced DC electrical power from one or both of the PV assembly or the hydrogen-based PEM fuel assembly to a DC electrical power supply, or
      at least one DC/AC inverter configured to convert the produced DC electrical power from one or both of the PV assembly or the hydrogen-based PEM fuel assembly to an alternating current (AC) electrical power supply; and
   an off-grid hydrocarbon production or processing facility electrically coupled to the power electronics assembly to receive at least one of the DC electrical power supply or the AC electrical power supply from one or both of the PV assembly or the hydrogen-based PEM fuel cell assembly.

2. The power system of claim 1, wherein the power electronics assembly comprises both of:
   the at least one DC/DC converter configured to convert the produced DC electrical power from one or both of the PV assembly or the hydrogen-based PEM fuel assembly to the DC electrical power supply, and
   the at least one DC/AC inverter configured to convert the produced DC electrical power from one or both of the PV assembly or the hydrogen-based PEM fuel assembly to the AC electrical power supply.

3. The power system of claim 2, wherein the power electronics assembly further comprises:
   a DC power bus electrically coupled to the PV assembly and the hydrogen-based PEM fuel assembly on a first side through the at least one DC/DC converter; and
   an AC power bus electrically coupled to a second side of the DC power bus opposite the first side through the at least one DC/AC inverter.

4. The power system of claim 3, wherein the power electronics further comprises at least another DC/DC converter electrically coupled to the second side of the DC power bus.

5. The power system of claim 3, further comprising an energy storage assembly electrically coupled to the PV assembly and the hydrogen-based PEM fuel cell assembly through the first side of the DC power bus.

6. The power system of claim 5, wherein the energy storage assembly is electrically coupled to the off-grid hydrocarbon production or processing facility through the power electronics assembly.

7. The power system of claim 3, wherein the power electronics further comprises at least one transformer electrically coupled between the AC power bus and the off-grid hydrocarbon production or processing facility.

8. The power system of claim 1, wherein the hydrogen fuel source further comprises:
   at least one multi-fuel reformer assembly configured to receive one or more fuel fluids and a combustion fluid and produce a methane rich gas or a mixture of hydrogen ($H_2$) and carbon dioxide ($CO_2$); and
   at least one catalytic membrane reformer fluidly coupled to the hydrogen-based PEM fuel cell assembly and the at least one multi-fuel reformer assembly to receive the produced methane rich gas or the mixture of $H_2$ and $CO_2$, the at least one catalytic membrane reformer configured to convert the produced methane rich gas or the mixture of $H_2$ and $CO_2$ into hydrogen and $CO_2$ and provide the hydrogen to the hydrogen-based PEM fuel cell assembly.

9. The power system of claim 1, further comprising a carbon capture and utilization unit fluidly coupled to the at least one catalytic membrane reformer to receive the $CO_2$ from the at least one catalytic membrane reformer.

10. The power system of claim 1 wherein the one or more fuel fluids comprises at least one of liquefied petroleum gas, ammonia, or methane.

11. The power system of claim 1, wherein the hydrogen-based PEM fuel cell assembly comprises a reversible fuel-cell assembly.

12. The power system of claim 11, wherein the reversible fuel-cell assembly comprises a reversible PEM fuel cell assembly.

13. The power system of claim 1, wherein the hydrogen fuel source further comprises:

at least one multi-fuel ammonia decomposition assembly configured to produce a mixture of hydrogen ($H_2$) and nitrogen ($N_2$); and at least one catalytic membrane ammonia fluidly coupled to the hydrogen-based PEM fuel cell assembly and the at least one multi-fuel reformer assembly to receive the produced methane rich gas or the mixture of $H_2$ and $CO_2$, the at least one catalytic membrane reformer configured to convert the produced methane rich gas or the mixture of $H_2$ and $CO_2$ into hydrogen and $CO_2$ and provide the hydrogen to the hydrogen-based PEM fuel cell assembly.

14. A method for producing electrical power, comprising:

producing direct current (DC) electrical power from solar energy with a plurality of photovoltaic (PV) cells of a PV assembly;

producing DC electrical power from a hydrogen fuel source with a hydrogen-based polymer exchange membrane (PEM) fuel cell assembly, the hydrogen fuel source comprising one or more portable hydrogen fuel storage tanks;

supplying hydrogen from the one or more portable hydrogen fuel storage tanks to the hydrogen-based PEM fuel cell assembly;

operating a power electronics assembly electrically coupled to the PV assembly and the hydrogen-based PEM fuel cell assembly, the operating comprising:

operating at least one DC/DC converter to convert the produced DC electrical power from one or both of the PV assembly or the hydrogen-based PEM fuel assembly to a DC electrical power supply, or operating at least one DC/AC inverter to convert the produced DC electrical power from one or both of the PV assembly or the hydrogen-based PEM fuel assembly to an alternating current (AC) electrical power supply; and supplying at least one of the DC electrical power supply or the AC electrical power supply from the power electronics assembly to an off-grid hydrocarbon production or processing facility.

15. The method of claim 14, further comprising:

operating the at least one DC/DC converter to convert the produced DC electrical power from one or both of the PV assembly or the hydrogen-based PEM fuel assembly to the DC electrical power supply, and operating the at least one DC/AC inverter to convert the produced DC electrical power from one or both of the PV assembly or the hydrogen-based PEM fuel assembly to the AC electrical power supply.

16. The method of claim 15, wherein operating the power electronics assembly further comprises:

providing the produced DC power from at least one of the PV assembly or the hydrogen-based PEM fuel assembly to a first side of a DC power bus through the at least one DC/DC converter; and providing converted DC power from a second side of the DC power bus opposite the first side to an AC power bus through the at least one DC/AC inverter.

17. The method of claim 16, further comprising converting the produced DC power from the at least one of the PV assembly or the hydrogen-based PEM fuel assembly through the DC power bus with at least another DC/DC converter electrically coupled between the second side of the DC power bus and the off-grid hydrocarbon production or processing facility.

18. The method of claim 17, further comprising providing DC electrical power from an energy storage assembly to the first side of the DC power bus.

19. The method of claim 18, further comprising:

prior to providing DC electrical power from the energy storage assembly to the first side of the DC power bus, comparing an amount of at least one of the DC electrical power supply or the AC electrical power supply to a threshold amount; and based on the compared amount being less than the threshold amount, operating the power electronics assembly to at least one of:

providing the DC electrical power from the energy storage assembly through the DC power bus to the at least another DC/DC converter;

providing the DC electrical power from the energy storage assembly through the DC power bus to the off-grid hydrocarbon production or processing facility; or providing the DC electrical power from the energy storage assembly through the DC power bus to the DC/AC inverter.

20. The method of claim 16, wherein operating the power electronics assembly further comprises transforming the AC electrical power supply with at least one transformer electrically coupled between the AC power bus and the off-grid hydrocarbon production or processing facility.

21. The method of claim 14, further comprising:

producing a methane rich gas or a mixture of hydrogen ($H_2$) and nitrogen ($N_2$) with at least one multi-fuel reformer assembly from one or more fuel fluids and a combustion fluid;

supplying the produced methane rich gas with water or ammonia the mixture of $H_2$ and $N_2$ to at least one catalytic membrane reformer fluidly coupled to the hydrogen-based PEM fuel cell assembly;

using the produced methane rich gas (LPG or $CH_4$) with water ($H_2O$) to produce hydrogen and carbon dioxide or with only ammonia the mixture of $H_2$ and $N_2$ into hydrogen and nitrogen—with the at least one catalytic membrane reformer; and providing the hydrogen to the hydrogen-based PEM fuel cell assembly.

22. The method of claim 21, further comprising supplying the $CO_2$ from the at least one catalytic membrane reformer to a carbon capture and utilization unit.

23. The method of claim 21, wherein the one or more fuel fluids comprises at least one of liquefied petroleum gas, ammonia, or methane.

24. The method of claim 21, further comprising supplying hydrogen to the hydrogen-based PEM fuel cell assembly from one or more portable hydrogen fuel storage tanks.

25. An off-grid power system, comprising:

a first renewable electrical power assembly that comprises a photovoltaic (PV) system that comprises one or more PV solar power cells and is configured to produce direct current (DC) electrical power from a first renewable source that comprises solar energy;

a second renewable electrical power assembly that comprises a polymer exchange membrane (PEM) fuel cell assembly and is configured to produce DC electrical power from a second renewable source that comprises hydrogen fuel;

an electrical power circuit that electrically couples the first and second renewable electrical power assemblies together and changes the DC electrical power to at least one of a DC power supply or an alternating current (AC) power supply; and
an off-grid hydrocarbon production or processing facility electrically coupled to the electrical power circuit to receive the at least one of the DC power supply or the AC power supply from the electrical power circuit.

26. The off-grid power system of claim 25, wherein the electrical power circuit comprises at least two of a DC/DC converter, a DC/AC inverter or an AC/AC transformer.

27. The off-grid power system of claim 25, further comprising one or more batteries electrically coupled with the first and second renewable electrical power assemblies and the off-grid hydrocarbon production or processing facility through the electrical power circuit.

28. A power system, comprising:
a photovoltaic (PV) assembly that comprises a plurality of PV cells configured to produce direct current (DC) electrical power from solar energy;
a hydrogen-based polymer exchange membrane (PEM) fuel cell assembly configured to produce DC electrical power from a hydrogen fuel source, the hydrogen fuel source comprising:
at least one multi-fuel reformer assembly configured to receive one or more fuel fluids and a combustion fluid and produce a methane rich gas or a mixture of hydrogen ($H_2$) and carbon dioxide ($CO_2$), and
at least one catalytic membrane reformer fluidly coupled to the hydrogen-based PEM fuel cell assembly and the at least one multi-fuel reformer assembly to receive the produced methane rich gas or the mixture of $H_2$ and $CO_2$, the at least one catalytic membrane reformer configured to convert the produced methane rich gas or the mixture of $H_2$ and $CO_2$ into hydrogen and $CO_2$ and provide the hydrogen to the hydrogen-based PEM fuel cell assembly;
a power electronics assembly comprising at least one of:
at least one DC/DC converter configured to convert the produced DC electrical power from one or both of the PV assembly or the hydrogen-based PEM fuel assembly to a DC electrical power supply, or
at least one DC/AC inverter configured to convert the produced DC electrical power from one or both of the PV assembly or the hydrogen-based PEM fuel assembly to an alternating current (AC) electrical power supply; and
an off-grid hydrocarbon production or processing facility electrically coupled to the power electronics assembly to receive at least one of the DC electrical power supply or the AC electrical power supply from one or both of the PV assembly or the hydrogen-based PEM fuel cell assembly.

29. The power system of claim 28, further comprising a carbon capture and utilization unit fluidly coupled to the at least one catalytic membrane reformer to receive the $CO_2$ from the at least one catalytic membrane reformer.

30. The power system of claim 28, wherein the power electronics assembly comprises:
both of the at least one DC/DC converter configured to convert the produced DC electrical power from one or both of the PV assembly or the hydrogen-based PEM fuel assembly to the DC electrical power supply, and the at least one DC/AC inverter configured to convert the produced DC electrical power from one or both of the PV assembly or the hydrogen-based PEM fuel assembly to the AC electrical power supply;
a DC power bus electrically coupled to the PV assembly and the hydrogen-based PEM fuel assembly on a first side through the at least one DC/DC converter;
an AC power bus electrically coupled to a second side of the DC power bus opposite the first side through the at least one DC/AC inverter; and
at least another DC/DC converter electrically coupled to the second side of the DC power bus.

31. The power system of claim 30, further comprising an energy storage assembly electrically coupled to the PV assembly and the hydrogen-based PEM fuel cell assembly through the first side of the DC power bus.

32. A method for producing electrical power, comprising:
producing direct current (DC) electrical power from solar energy with a plurality of photovoltaic (PV) cells of a PV assembly;
producing a methane rich gas or a mixture of hydrogen ($H_2$) and nitrogen ($N_2$) with at least one multi-fuel reformer assembly from one or more fuel fluids and a combustion fluid;
supplying the produced methane rich gas with water or ammonia the mixture of $H_2$ and $N_2$ to at least one catalytic membrane reformer fluidly coupled to the hydrogen-based PEM fuel cell assembly;
using the produced methane rich gas (LPG or $CH_4$) with water ($H_2O$) to produce hydrogen and carbon dioxide or with only ammonia the mixture of $H_2$ and $N_2$ into hydrogen and nitrogen with the at least one catalytic membrane reformer;
providing the hydrogen to a hydrogen-based polymer exchange membrane (PEM) fuel cell assembly;
producing DC electrical power from the hydrogen-based PEM fuel cell assembly with the provided hydrogen;
operating a power electronics assembly electrically coupled to the PV assembly and the hydrogen-based PEM fuel cell assembly, the operating comprising:
operating at least one DC/DC converter to convert the produced DC electrical power from one or both of the PV assembly or the hydrogen-based PEM fuel assembly to a DC electrical power supply, or
operating at least one DC/AC inverter to convert the produced DC electrical power from one or both of the PV assembly or the hydrogen-based PEM fuel assembly to an alternating current (AC) electrical power supply; and
supplying at least one of the DC electrical power supply or the AC electrical power supply from the power electronics assembly to an off-grid hydrocarbon production or processing facility;
providing DC electrical power from an energy storage assembly to the first side of the DC power bus.

33. The method of claim 32, further comprising:
operating the at least one DC/DC converter to convert the produced DC electrical power from one or both of the PV assembly or the hydrogen-based PEM fuel assembly to the DC electrical power supply, and operating the at least one DC/AC inverter to convert the produced DC electrical power from one or both of the PV assembly or the hydrogen-based PEM fuel assembly to the AC electrical power supply;
providing the produced DC power from at least one of the PV assembly or the hydrogen-based PEM fuel assembly to a first side of a DC power bus through the at least one DC/DC converter; and
providing converted DC power from a second side of the DC power bus opposite the first side to an AC power bus through the at least one DC/AC inverter.

34. The method of claim 33, further comprising converting the produced DC power from the at least one of the PV assembly or the hydrogen-based PEM fuel assembly through the DC power bus with at least another DC/DC converter electrically coupled between the second side of the DC power bus and the off-grid hydrocarbon production or processing facility.

35. The method of claim 34, further comprising providing DC electrical power from an energy storage assembly to the first side of the DC power bus.

* * * * *

UNITED STATES PATENT AND TRADEMARK OFFICE
CERTIFICATE OF CORRECTION

PATENT NO. : 11,277,004 B1
APPLICATION NO. : 17/140266
DATED : March 15, 2022
INVENTOR(S) : Sai P. Katikaneni, Kunho Lee and Tolga Tural It is certified that error appears in the above-identified patent and that said Letters Patent is hereby corrected as shown below:

In the Claims

<u>Column 22</u>
Claim 10, Line 57, delete "claim 1" and insert -- claim 1, --.

<u>Column 24</u>
Claim 21, Line 42, delete "nitrogen—with" and insert -- nitrogen with --.

Signed and Sealed this
Seventh Day of June, 2022

Katherine Kelly Vidal
*Director of the United States Patent and Trademark Office*